United States Patent [19]

Tanabe

[11] Patent Number: 4,901,198
[45] Date of Patent: Feb. 13, 1990

[54] THROUGH CAPACITOR

[75] Inventor: Takeshi Tanabe, Fukui, Japan

[73] Assignee: Murata Manufacturing Co., Ltd., Kyoto, Japan

[21] Appl. No.: 764,065

[22] Filed: Aug. 9, 1985

[51] Int. Cl.[4] ............................................. H01G 1/14
[52] U.S. Cl. ...................................................... 361/302
[58] Field of Search ........................ 361/307, 320, 321

[56] References Cited

U.S. PATENT DOCUMENTS

| 2,430,433 | 11/1947 | Minnium | 361/321 X |
| 3,808,478 | 4/1974 | Winkler | 361/307 X |
| 3,953,664 | 4/1976 | Tsunashima | 361/321 X |
| 4,314,213 | 2/1982 | Wakino | 361/307 X |
| 4,319,304 | 3/1982 | Fink | 361/307 |

FOREIGN PATENT DOCUMENTS 126559  1/1948  Australia ............... 361/307

Primary Examiner—Donald Griffin
Attorney, Agent, or Firm—Wenderoth, Lind & Ponack

[57] ABSTRACT

A through capacitor which includes a generally cylindrical inner electrode having a through hole through which a lead terminal extends. The lead terminal has a protuberance adjacent to and axially outward of a first opening of the hole. A generally cylindrical outer electrode surrounds the inner electrode in radially spaced relation thereto. The lead terminal is fixed to the inner electrode with solder including a radially expanded portion of solder embedding the protuberance therein. The inner electrode is bent radially outwardly such that the through hole is tapered radially outwardly toward a second opening opposite the first opening to define an expanded space between the lead terminal and the inner electrode. Solder fills the expanded space so as to resist axial movement of the lead terminal through the through hole in the direction from the second opening toward the first opening.

7 Claims, 1 Drawing Sheet

THROUGH CAPACITOR

BACKGROUND OF THE INVENTION

The present invention relates to a through capacitor used principally as a low-pass filter in various kinds of electric instrument, and in particular to a through capacitor which can prevent a lead terminal from separating and cracks from generating in a capacitor in the bending of the lead terminal.

FIG. 5 shows the conventional through capacitor generally known as a low-pass filter.

Referring now to FIG. 5, a through capacitor comprises a capacitor 3 having a di-, electric solid body 3' formed of, for example, ceramics or the like, in an almost cylindrical shape and provided with electrodes 1 and 2 formed on the internal periphery and the external periphery thereof, respectively, a lead terminal 6 axially passing through a through hole 4 provided in the internal electrode 1 and solder 5 for fixedly connecting the internal electrode 1 with the lead terminal 6.

The capacitor body 3, is provided with a tapered flange member 7 in the upper portion thereof, the internal electrode 1 being extended along the upper surface of the flange member 7, and the solder 5 for connecting the lead terminal 6 with the internal electrode 1 being piled up also on the flange portion 7 to form an expanded portion 5a.

The lead terminal 6 is provided with a projection 11 engaging with the upper portion side of the flange member 7, the projection 11 determining the position of the lead terminal 6 in relation to the capacitor 3, in addition, the projection 11 being buried in the expanded portion 5a of the solder 5 to fixedly connect the lead terminal 6 with the solder 5.

On the other hand, the external electrode 2 is extended along the lower surface of the flange member 7, the capacitor 3 being put in a circular opening 9 of a group plate 8 in a portion of the external electrode 2 and fixedly connected with the earth plate 8 by means of solder 10, and the flange member 7 determining the position of the capacitor 3 relative to the ground plate 8.

With a through capacitor having the above described construction, if an electric signal passes through the lead terminal 6, high-frequency noise components in the signal run into the ground plate 8 via the capacitor 3.

However, with the above described through capacitor, even though a downward tensile force and pressing force are given to the lead terminal 6, the lead terminal 6 can be prevented from or separating from the capacitor 3 due to the projection 11 and the expanded portion 5a of an solder 5 while if the upward tensile force and pressing force are given to the lead terminal 6, a problem occurs in that the internal elecrode 1 is comparatively easily separated from the capacitor 3 and the lead terminal 6 is separated from the capacitor 3.

It can be thought to overcome this problem by increasing the width of the capacitor 3 in the longitudinal direction of the lead terminal 6 to increase the contact area between the capacitor body 3 and the internal electrode 1. However, in such a case, a new disadvantage occurs in that a through capacitor is large-sized.

In addition, with the above described construction, as shown by a phantom line in FIG. 5, also the problem occurs in that a bent portion of the lead terminal 6 is brought into contact with the vicinity of the lower opened end 12 of the hole 4 of the capacitor 3 in the bending of the lead terminal 6, whereby cracks are apt to be generated in the capacitor 3.

Thus, it is an object of the present invention to provide a through capacitor in which a lead terminal is difficult to escape from a capacitor.

It is another object of the present invention to provide a through capacitor in which cracks are difficult to be generated on a capacitor in the bending of a lead terminal.

BRIEF DESCRIPTION OF THE DRAWINGS

The above and other objects and features of the invention will appear more fully hereinafter from a consideration of the following description taken in conjunction with the accompanying drawing wherein one example is illustrated by way of example.

FIG. 2 is a longitudinal cross section showing the state where a lead terminal as shown in FIG. 1 is bent.

DETAILED DESCRIPTION OF THE PREFERRED EMBODIMENTS

Figure 1:
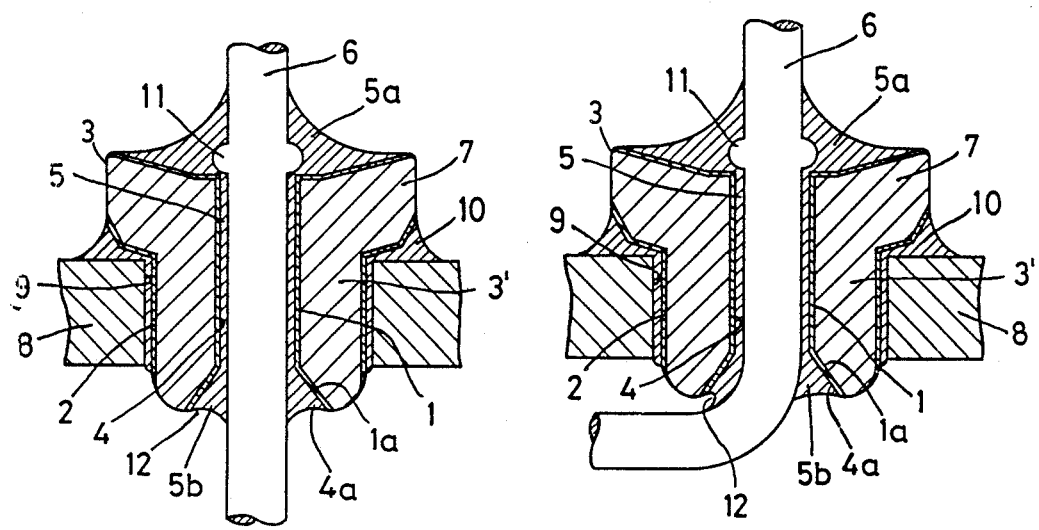
FIG. 1 is a longitudinal cross section showing a first embodiment of a through capacitor according to the present invention.
Figure 5:
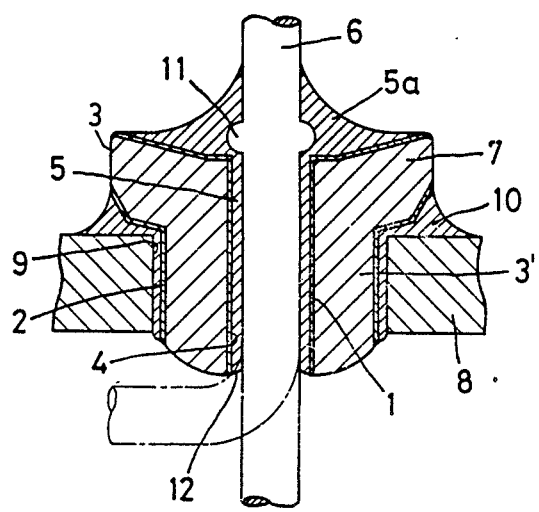
FIG. 5 is a longitudinal cross section showing the conventional through capacitor.

The first embodiment of a through capacitor as shown in FIG. 1 and FIG. 2 has a similar basic construction as the conventional through capacitor described with reference to FIG. 5 and the corresponding parts are identically marked, so that their detailed description is omitted.

Referring now to FIGS. 1 and 2, a cylindrical capacitor 3 is provided with a tapered portion 4a, which gradually expands toward an opened end 12, in the vicinity of the lower opened end 12 of a central through hole 4 thereof, also the tapered portion 4a being coated with an internal electrode 1, and an expanded portion 5b of solder 5 for mounting the lead terminal 6 on the internal electrode 1 being formed between a tapered portion 1a of the internal electrode 1 and the lead terminal 6.

With this construction, even through an upward tensile force or pressing force is given to the lead terminal 6, the expanded portion 5b of the solder 5 in the tapered portion 1a of the internal electrode 1 functions as a resistant portion against the upward tensile force or pressing force whereby the internal electrode 1 is difficult to be separated from the capacitor 3 and the possibility of separation of the lead terminal 6 can be reduced.

That is to say, the solder 5 is integrally connected with the lead terminal 6 by burying in the expanded portion 5a of the solder 5 the projection 11 provided in the lead terminal 6 and both the upper end expanded portion 5a and the lower end expanded portion 5b of the solder 5 function as the resistant portion against the escape of the lead terminal 6 in opposite directions, whereby the lead terminal 6 can be prevented from escaping in both the upward direction and the downward direction.

In addition, as shown in FIG. 2, the bent portion of the lead terminal 6 is difficult to be brought into contact with the vicinity of the lower opened end 12 of the through hole 4 of the capacitor 3 due to the expanded portion 5b of the solder 5 in the bending of a portion of the lead terminal 6 projecting downward from the capacitor 3, whereby also cracks in the bending of the lead terminal 6 can be reduced.

Figure 3:
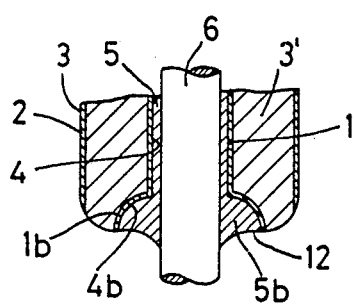
FIG. 3 is a longitudinal cross section showing principal parts in a second embodiment of a through capacitor according to the present invention.
Figure 4:
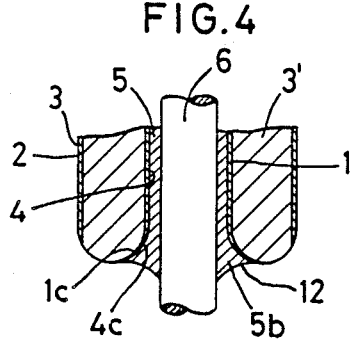
FIG. 4 is a longitudinal cross section showing principal parts in a third embodiment of a through capacitor according to the present invention.

Next, FIGS. 3 and 4 show different embodiments of a tapered portion provided at the lower opened end of a through hole 4 of a capacitor 3. In FIG. 3, a bowl-shaped tapered portion 4b is provided in place of an umbrella-shaped tapered portion 4a as shown in FIG. 1. In addition, in FIG. 4, an inversed bowl-shaped tapered portion 4c is provided in place of the umbrella-shaped tapered portion 4a. In these embodiments, the internal electrode 1 is provided with a tapered portion 1b (FIG. 3) or a tapered portion 1c (FIG. 4), corresponding to the tapered portion 4b or 4c, respectively.

Furthermore, although the upper end face of the capacitor 3 is formed in a tapered shape in order to make the formation of the expanded portion 5a of solder easy, it may be flat.

In addition, the present invention can be applied also to a through capacitor provided with a disc capacitor having a relatively small axial thickness having a through hole through which a lead terminal passes at the center thereof.

In such a case, solder for mounting the lead terminal on the internal electrode of the disc capacitor can be completely housed in the disc capacitor to remarkably reduce the axial width of the through capacitor by constructing the vicinity of both opened ends of the central hole of the disc capacitor similarly to the vicinity of the lower opened end 12 of the hole 4 of the capacitor 3 as shown in FIG. 1.

We claim:

1. A through capacitor, comprising:
   a lead terminal extending along a center axis;
   a generally cylindrical inner electrode having a through hole therethrough extending along said center axis, surrounding said lead terminal, said lead terminal extending entirely through said inner electrode, said hole having first and second open ends at respective first and second opposite axial ends of said inner electrode, said lead terminal having a protuberance extending radially outwardly, located adjacent to and axially outward of said first opening;
   a generally cylindrical outer electrode surrounding said inner electrode in radially spaced relation thereto; and
   solder fixedly connecting said lead terminal to said inner electrode, said solder having a first radially expanded portion surrounding said protuberance so as to embed said protuberance therein;
   said inner electrode bending radially outwardly and toward said second opening at said second end such that said through hole is tapered radially outwardly toward said second opening at said second end to define an expanded space between said lead terminal and said inner electrode at said second end, said solder filling said expanded space so as to resist axial movement of said lead terminal through said through hole in the direction from said second end toward said first end.

2. A through capacitor as set forth in claim 1, further comprising a flange member at said first end, having a tapered upper surface so as to receive said expanded portion of solder thereon.

3. A through capacitor as set forth in claim 1, further comprising a flange member at said first end, having a flat upper surface facing away from said second end.

4. A through capacitor as set forth in claim 1, wherein said through hole is tapered in a linearly extending umbrella-like shaped.

5. A through capacitor as set forth in claim 1, wherein said through hole is tapered in a bowl-like shape in the vicinity of another opened end thereof.

6. A through capacitor as set forth in claim 1, wherein said through hole is tapered is an inversed bowl-like shape.

7. A through capacitor as in claim 1, further comprising a dielectric solid capacitor body filling the space between and connecting said inner electrode and said outer electrode, said inner electrode being formed on an inner periphery of said body, said inner periphery being tapered radially outwardly toward said second opening at said second end.

* * * * *

UNITED STATES PATENT AND TRADEMARK OFFICE
CERTIFICATE OF CORRECTION

PATENT NO.   :   4,901,198
DATED        :   February 13, 1990
INVENTOR(S)  :   Takeshi TANABE It is certified that error appears in the above-identified patent and that said Letters Patent is hereby corrected as shown below:

On the title page, after item [22], insert the following:

--[30]  Foreign application priority data
        August 14, 1984[JP] Japan ... 59-124509[U]--.

Signed and Sealed this

Nineteenth Day of May, 1992

*Attest:*

DOUGLAS B. COMER

*Attesting Officer*          Acting Commissioner of Patents and Trademarks